United States Patent [19]

Kumar et al.

[11] Patent Number: 5,706,200
[45] Date of Patent: Jan. 6, 1998

[54] SCHEDULING SYSTEM AND SCHEDULING METHOD FOR REENTRANT LINE PROCESSES

[75] Inventors: Panganamala Ramana Kumar, Urbana, Ill.; Ray M. Richardson, Tempe, Ariz.

[73] Assignee: The Board of Trustees of the University of Ill., Urbana, Ill.

[21] Appl. No.: 698,150

[22] Filed: Aug. 15, 1996

[51] Int. Cl.$^6$ .................................................. G06F 19/00
[52] U.S. Cl. ................................ 364/468.06; 395/208
[58] Field of Search ...................... 364/468.05, 468.06, 364/468.07, 468.08, 468.23, 488–491, 578; 395/208, 209, 672, 673, 674, 675

[56] References Cited

U.S. PATENT DOCUMENTS

| | | | |
|---|---|---|---|
| 5,233,533 | 8/1993 | Edstrom et al. | 364/468.09 |
| 5,291,397 | 3/1994 | Powell | 364/468.03 |
| 5,546,326 | 8/1996 | Tai | 364/468.05 X |

OTHER PUBLICATIONS

Lawrence M. Wein, Scheduling Semiconductor Wafer Fabrication, IEEE Transactions on Semi–conductor Manufacturing, pp. 115–130 (Aug. 1988).

Steve Lu, Deepa Ramaswamy, and P.R. Kumar, Efficient Scheduling Policies to Reduce Mean and Variance of Cycle-Time in Semiconductor Manufacturing Plants, IEEE Transactions on Semiconductor Manufacturing, pp. 374–388 (Aug. 1994).

David Sohl and P.R. Kumar, Fluctuation Smoothing Scheduling Policies for Multiple Process Flow Fabrication Plants, International Electronics Manufacturing Technology Symposium—Austin, Tex., U.S.A. (Oct. 1995).

David Louis Sohl, Fluctuation Smoothing Scheduling Policies for Multiclass Queuing Networks, University of Illinois at Urbana–Champaign, May 1995, Thesis.

Chad Andrew Griffin, Fluctuation Smoothing Scheduling Policies for Semiconductor Manufacturing Plants, University of Illinois at Urbana–Champaign, 1994, Thesis.

*Primary Examiner*—Joseph Ruggiero
*Attorney, Agent, or Firm*—Wood, Phillips, VanSanten, Clark & Mortimer

[57] ABSTRACT

A multiple-product reentrant line scheduling method includes the steps of storing a time measurement variable for each one of a plurality of incomplete products disposed in a buffer at a workstation, the time measurement variable representing the entry of the incomplete product into the reentrant line, storing a time measurement variable for the buffer representing the time remaining for incomplete products of the same product type disposed in the buffer to be completed, calculating the difference between the stored time measurement variable for each incomplete product and the stored time measurement variable for the buffer to generate a slack variable for each incomplete product, normalizing the slack variable for each incomplete product by comparing the slack variable of each incomplete product with the slack variables for all incomplete products of same product type that have passed through the workstation to generate a selection variable for each incomplete product, comparing the selection variables to select one of the incomplete products for processing at the workstation, and processing the selected incomplete product. An apparatus for carrying out the scheduling method is also provided.

10 Claims, 4 Drawing Sheets

SCHEDULING SYSTEM AND SCHEDULING METHOD FOR REENTRANT LINE PROCESSES

STATEMENT AS TO RIGHTS TO INVENTIONS MADE UNDER FEDERALLY-SPONSORED RESEARCH AND DEVELOPMENT

This invention was made with Government support under Contract ECS-9403571 awarded by the National Science Foundation, DAAH 04-95-1-0090 awarded by the U.S. Army Research Office, and Contract N00014-96-1-0129 awarded by the Joint Services Electronics Program. The Government has certain rights in the invention.

FIELD OF THE INVENTION

The present invention is directed to a system and method for scheduling incomplete products in a system using reentrant line processing. In particular, the present invention is directed to a scheduling system and method which uses a least slack policy to prioritize competing incomplete products in a system using reentrant line processing.

BACKGROUND OF THE INVENTION

Most people are probably familiar with systems of mass-production which use flow shop processing. In a production system using flow shop processing, a conveyor system carries the incomplete product along a line of workstations. At each workstation, a different step in the fabrication of the product is performed. For example, in an automobile plant using flow shop processing, the chassis of the automobile may be conveyed along to a first workstation where the engine is installed, a second workstation where the drive train is installed, a third workstation where the axles are installed and so on. In theory, from beginning to end, the incomplete product visits each workstation only once during its travel down the assembly line.

Most people are probably not familiar with systems of mass-production using a second type of processing known as reentrant line processing. In a production system using reentrant line processing, the incomplete product is conveyed along a line of workstations, but the incomplete product may visit the same workstation several times during its travels along the line. Reentrant line processing is commonly used in the semiconductor industry, where the same incomplete product, in the form of a lot of wafers, may undergo the same steps of cleaning, oxidation, deposition, metallization, etching, ion implantation, and stripping several times before the semiconductor product is complete.

Figure 1:
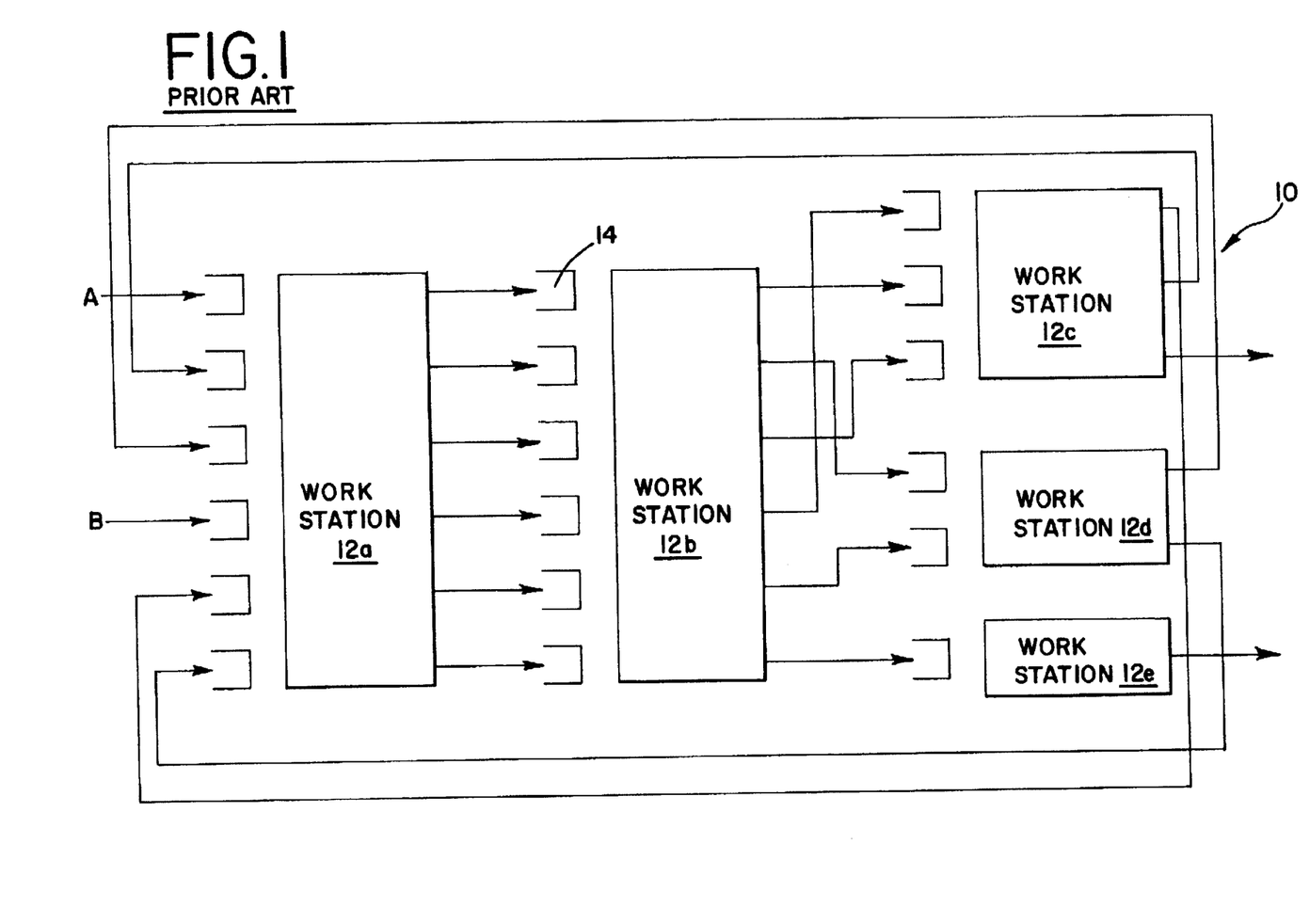
FIG. 1 is a block diagram of a production system using reentrant line processing wherein incomplete products of different product types in various stages of completion compete at multiple workstations for limited resources, for example processing time.

FIG. 1 illustrates a simplified multiple-product type production or fabrication system 10 using reentrant line processing. In the system 10, two products types, A and B, are being fabricated using five workstations 12a, 12b, 12c, 12d and 12e. Each workstation 12 has up to six buffers 14 in which products in various stages of completion are placed for processing at the workstation 12. For example, the product type A manufactured along the uppermost reentrant line visits the workstations 12a and 12b three times, and the workstation 12c twice prior to being completed and exiting from the system 10. Typically, under industrial conditions, a multiple-product type fabrication system using reentrant line processing may fabricate up to a dozen product types using thirty to one hundred workstations, each product type requiring hundreds of processing steps.

As can be seen in FIG. 1, at any particular time during the operation of the fabrication system 10, the buffers 14 at the workstations 12a, 12b, 12c, 12d, and 12e may contain numerous incomplete products of both products types in different stages of completion. However, the resources at each of the workstations 12 are not infinite, but finite. If each workstation 12 has limited resources, then only one incomplete product from one buffer 14 can be processed at each workstation 12 at a given time. Therefore, the incomplete products must compete for the limited resources at each workstation 12.

As a consequence of the limited nature of the workstation resources and the competition between incomplete products of both product types for these resources, the incomplete products, or wafer lots, in the buffers 14 spend a considerable amount of their total fabrication time waiting for the workstation 12 to become available. Thus, the time required to fabricate a product type using reentrant line processing is considerably longer than the sum of the processing times at the various workstations 12 along the reentrant line for a given product type. Under industrial conditions, the amount of time an incomplete product spends during fabrication waiting in a buffer 14 may be in excess of eighty percent of the product's total fabrication time.

Commonly, the time actually required to fabricate a product is called the product's cycle time. By contrast, the sum of the product's processing times during each of the steps at each one of the various workstations 12 required to complete the product is referred to as its theoretical cycle time. The ratio of the product's cycle time to its theoretical cycle time is known as the product's cycle time multiplier, or the actual-to-theoretical ratio.

Presently, there exists a great incentive within the semiconductor fabrication industry to reduce the mean product cycle time relative to the theoretical product cycle time, and to reduce the variance in product cycle time. The cost of a state of the art fabrication plant is about one billion dollars. This cost is only expected to increase as feature size shrinks and new sophisticated and expensive technologies are required to fabricate the next generation of semiconductor devices. To recover the costs of building such a plant, it is highly desirable for the plant to achieve high yields in a timely manner so as to ensure that the company that built the plant can take advantage of opportunities in the marketplace as these opportunities present themselves. (The volatile nature of the opportunities in the electronics industry is reflected by the fact that the product life of an average electronics product is approximately six months.) By reducing the mean product cycle time relative to the theoretical cycle time, product yield can be increased, product costs can be decreased, exposure to contaminants can be reduced, capital unprofitably committed to maintaining work-in-process can be reduced, prototyping can be speeded up, and response time to market forces (e.g. increased/decreased demand) can be shortened. Reductions in the variance of the cycle time can lead to improved ability to meet promised dates for product delivery.

Preferably, reductions in both the mean cycle time and the variance in cycle time are achieved simultaneously. In fact, it is presently the avowed goal of the semiconductor industry to reduce the product cycle time multiplier to 1.25 and to increase on-time delivery within 24 hours of promised ship date to 95% by the year 2007.

Several attempts have been made by those in the semiconductor industry to achieve reductions in mean cycle time and cycle time variance for fabrication systems using reentrant line processing. Initially, Wein suggested that for a single-product type fabrication system using reentrant line processing, reductions in mean cycle time and cycle time variance relative to the standard FIFO (First In, First Out) policy could be achieved by controlling the release of the wafer lots into the fabrication system, rather than scheduling the processing of the lots waiting in each of the buffers at a given workstation. Lawrence Wein, Scheduling Semiconductor Wafer Fabrication, IEEE Transactions on Semiconductor Manufacturing, pp. 115–130 (August 1988). Lu, Ramaswamy, and Kumar later suggested that while release control policies may be helpful, control of the scheduling of the lots waiting at each workstation could bring about even greater reductions in mean cycle time and cycle time variance. Steve Lu, Deepa Ramaswamy, and P. R. Kumar, Efficient Scheduling Policies to Reduce Mean and Variance of Cycle-Time in Semiconductor Manufacturing Plants, IEEE Transactions on Semiconductor Manufacturing, pp. 374–388 (August 1994).

The method developed by Lu, Ramaswamy and Kumar has been described as a Fluctuation Smoothing Policy method, which has been further described as a subclass of the Least Slack Policy methods. As an illustration of these two policy methods, consider a single-product type reentrant line, where a plurality of wafer lots wait in a plurality of buffers until a workstation is free to process one of the lots. Using a Least Slack Policy method, each lot is associated with a first real number, each buffer is associated with a second real number, and a slack of each lot is defined as the difference between the first and second real numbers. According to this policy method, the next lot to be processed at the workstation will be chosen to be the lot with the smallest slack value.

According to the Fluctuation Smoothing Policy method, particular choices are made for the real numbers associated with each lot and each buffer. For instance, Lu, Ramaswamy and Kumar describe a Fluctuation Smoothing Policy method in which the variance of cycle time is reduced by setting the first real number to the arrival time of the lot to the system (i.e. release time of the lot), and letting the second real number be an estimate of the remaining cycle-time for a lot located in a given buffer. Lu, Ramaswamy and Kumar also describe another Fluctuation Smoothing Policy method for reducing the mean cycle time wherein the first real number is the quotient of the release number of the lot divided by the mean release rate for that product type, and the second real number is an estimate of the remaining cycle-time for a lot located in a given buffer.

One disadvantage of the scheduling policy method of Lu, Ramaswamy and Kumar was that the method was limited to single-product type fabrication systems. An additional disadvantage of the scheduling policy method of Lu, Ramaswamy and Kumar was that application of the method required an elaborate simulation model of the fabrication system or plant to be developed, and repeated iterations of the scheduling method to be performed on this simulation model before the results could be translated to the fabrication system in question. As a further consequence of the necessity to model the system in question, the method of Lu, Ramaswamy, and Kumar was particularly sensitive to discrepancies between the simulation model and the actual fabrication system, and was not easily adaptable to changes in the fabrication system.

An attempt to extend the scheduling policy method of Lu, Ramaswamy and Kumar to multiple-product type fabrication systems was made by Sohl and Kumar in 1995. See, e.g., David Sohl and P. R. Kumar, Fluctuation Smoothing Scheduling Policies for Multiple Process Flow Fabrication Plants, International Electronics Manufacturing Technology Symposium—Austin, Tex., U.S.A. (October 1995). Sohl and Kumar sought to extend the Fluctuation Smoothing Policy of Lu, Ramaswamy and Kumar by developing a definition of slack which used a scaling factor and a shift to adjust the slack values of different products of different product types so that a direct comparison could be made.

The scheduling policy method of Sohl and Kumar had several disadvantages. First, the method of Sohl and Kumar still required that an accurate simulation model of the fabrication plant be prepared, which modeling was and is an expensive undertaking. The method of Sohl and Kumar also required repeated iterations of the scheduling method to be performed on this simulation model before the results could be applied to the fabrication system in question. Additionally, the method of Sohl and Kumar required that some initial guesses be made about acceptable values for the scaling factor and the shift, and then limited investigation to only those initial guesses. Moreover, Sohl and Kumar acknowledged that an instability existed in the method such that for some simulation models the scheduling policy method would fail to converge, and would instead become unstably oscillatory. For many production systems, the method was unable to reduce the cycle times of all products simultaneously.

SUMMARY OF THE INVENTION

In one aspect of the invention, a method of scheduling the processing of a plurality of incomplete products at a workstation in a reentrant line, each one of the plurality of incomplete products disposed in a buffer at the workstation and processable into one of a plurality of product types, includes the steps of storing a time measurement variable for each one of the plurality of incomplete products representing an entry of the each one of the plurality of incomplete products into the reentrant line, and storing a time measurement variable for the buffer representing the time remaining for the incomplete products of the product type disposed in the buffer to be completed. The method also includes the step of calculating the difference between the stored time measurement variable for each one of the plurality of incomplete products and the stored time measurement variable for the buffer in which the each one of the plurality of incomplete products is disposed to generate a slack variable for each one of the plurality of incomplete products. According to the method, the slack variable is normalized for each one of the plurality of incomplete products by comparing the slack variable of the each one of the plurality of incomplete products with the slack variables for all incomplete products of the product type of the each one of the plurality of incomplete products that have passed through the workstation to generate a selection variable for the each one of the plurality of incomplete products. Also according to the method, the selection variables are compared for the plurality of incomplete products to select one of the plurality of incomplete products for processing at the workstation, and processing the one of the plurality of incomplete products selected in the step of comparing the selection variables for the plurality of incomplete products occurs.

In another aspect of the invention, an apparatus for scheduling the processing of a plurality of incomplete products at a workstation in a reentrant line, each one of the plurality of incomplete products disposed in a buffer at the workstation and processable into one of a plurality of product types, includes a mechanism for storing a time measurement variable for each one of the plurality of incomplete products representing an entry of each one of the plurality of incomplete products into the reentrant line and a mechanism for storing a time measurement variable for the buffer representing the time remaining for incomplete products of the product type disposed in the buffer to be completed. A mechanism for calculating the difference between the stored time measurement variable for each one of the plurality of incomplete products and the stored time measurement variable for the buffer in which the each one of the plurality of incomplete products is disposed to generate a slack variable for each one of the plurality of incomplete products is also provided. The apparatus also includes a mechanism for normalizing the slack variable for each one of the plurality of incomplete products by comparing the slack variable of the each one of the plurality of incomplete products with the slack variables for all incomplete products of the product type of the each one of the plurality of incomplete products that have passed through the workstation to generate a selection variable for the each one of the plurality of incomplete products and a mechanism for comparing the selection variables for the plurality of incomplete products to select one of the plurality of incomplete products for processing at the workstation.

The present invention may provide a scheduling method which can be used in multiple-product type production or fabrication systems at any time with any set of initial starting conditions for the production or fabrication system.

The present invention may provide a scheduling method which does not require a modeling of the production or fabrication system in question prior to application of the results to the production or fabrication system.

The present invention may provide a scheduling method which is capable of implementation in a real-time production or fabrication system using data available from the production or fabrication system.

The present invention may provide a scheduling method which is stable, robust, and adaptable to changes in the production or fabrication system using the method.

The present invention may provide a scheduling method which simultaneously improves the mean cycle time and the standard deviation of cycle time relative to the standard FIFO policy.

DESCRIPTION OF THE PREFERRED EMBODIMENT

According to one embodiment of the present invention, a method is provided for scheduling the processing of incomplete products or wafer lots at one of a plurality of workstations, each lot representing one product of a plurality of product types which is to be fabricated by a production or fabrication system using reentrant line processing, although the method can also be used for incomplete products all of a single product type. The method uses an Adaptive Normalized Slack Policy method to generate a selection variable for each lot waiting to be processed at the one of the plurality of workstations. The method then selects the lot associated with the smallest selection variable for processing at the workstation.

In particular, upon receiving notice that a workstation is available, the method preferably causes a variable representative of a time measurement associated with each processable lot, such as the arrival time of the lot in the system, to be read. This variable is compared with an estimated value of the time remaining to process the lot from the buffer through to completion as a product of one of the product types. The resultant comparison value for the lot, also known as the slack, is then normalized to generate the selection variable for each lot useful in comparing lots of different product types. Particularly, the slack is normalized by taking the difference between the slack and a mean slack value for the product type, and then dividing by the standard deviation of the slack values for the product type. The normalized slack values or selection variables for each of the lots at the workstation are then compared, and the lot associated with the smallest selection variable is selected for processing.

Moreover, variables for each product type and each buffer (such as the mean slack value, for example) are preferably updated as each lot is prioritized according to the scheduling method. Additionally, when a product is completed, i.e. when a lot passes completely through the fabrication system, the values for the estimated time of completion for each product type and each buffer may also be updated. Thus, the method is preferrably adaptive to changes in the actual performance of the production system.

Figure 2:
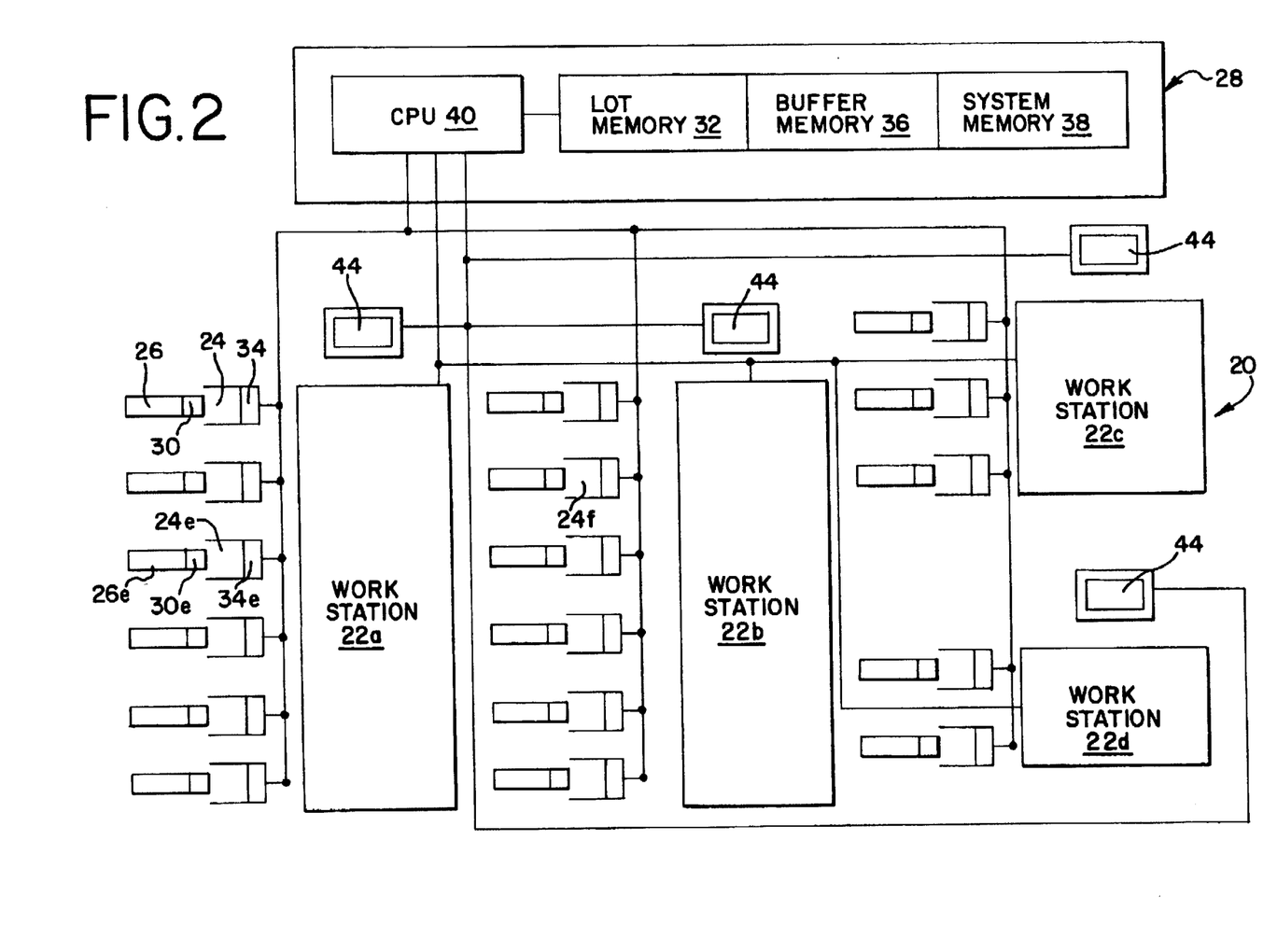
FIG. 2 is a block diagram of a system using reentrant line processing wherein scheduling of the processing of the incomplete products waiting at each of the workstations is controlled by a method of scheduling according to the present invention.

Referring initially to FIG. 2, a system 20 is shown including four workstations 22a, 22b, 22c and 22d arranged according to a reentrant line process. Each workstation 22 has a number of buffers 24 in which a lot 26 will wait to be processed pending the availability of the associated workstation 22. The system 20 also includes a computer 28 which receives data regarding the buffers 24, the lots 26, and the workstations 22, and which transmits processing orders to each of the workstations 22.

Preferably, each lot 26 has an unique identification code 30 which can be inputted to the computer 28 to identify the lot 26 to the computer 28. The identification code 30 allows for the location of the lot 26 to be ascertained by the computer 28 among the buffers 24 within the system 20 at any time. The code 30 also allows for a series of memory locations to be associated with the lot 26 within a lot memory 32 of the computer 28.

The identification code 30 may be in machine-readable form, for example as a bar code. Alternatively, the code 30 may be in a human-readable form, for example a series of numbers and/or letters which may be displayed on a card, label, or tag attached to the lot 26. A still further alternative is to combine a machine-readable and a human-readable format of the code 30 on a card, label or tag.

If the identification code 30 is in machine-readable form, then each buffer 24 preferably has an associated input device 34 which can be used to input the identification code 30 into the lot memory 32 of the computer 28. If the identification code is in a human-readable form, a single input device, such as a keyboard, may be installed at each workstation 22 for inputting the identification code 30 for each lot 26 into the lot memory 32.

As mentioned previously, the computer 28 includes the lot memory 32 in which is stored all the information regarding the lots 26, including the unique identification code 30 for each lot 26 and all associated lot variables for the lot 26. The computer also includes a memory 36 for storing a unique identification code (not shown) for each buffer 24 and all buffer variables associated with that buffer 24. Further, the computer includes a memory 38 for storing variables representative of the system 20 as a whole.

Coupled to the memories 32, 36, 38 is a central processing unit (CPU) 40. The CPU 40 stores data to the memories 32, 36, 38 in response to the receipt of data from the input devices 34 and workstations 22. The CPU 40 also reads the data stored in the memories 32, 36, 38 in response to calls from a program used to implement the method of the present invention. Further, the CPU 40 processes data read from the memories 32, 36, 38 according to the program of the present invention and issues processing orders to the workstations 22 as to which lot 26 in which buffer 24 will be processed at an available workstation 22.

The processing orders may be communicated to an operator located at the workstation 22 through the use of a video display device 44, such as a cathode ray tube or a LCD crystal display. Upon receiving the processing order displayed on the video display device 44, the operator then moves the lot 26 selected to be processed to the workstation 22. Alternatively, if the workstation 22 is fully automated, the processing order sent by the CPU 40 to the available workstation 22 may be transmitted directly to an automated loader or robot, as is known by those of ordinary skill in the art, so that the automated loader moves the lot 26 selected for processing to the workstation 22 from the buffer 24.

The control of movement of a lot 26e according to the method of the present invention can be further explained by reference to the system flow chart shown in FIG. 3. The system flow chart of FIG. 3 illustrates the movement of the lot 26e from the time the lot 26e enters the system 20 at the workstation 22a on left hand side of FIG. 2 to the time the lot 26e exits the system 20, either as a completed product via workstation 22c or 22d at the right hand side of FIG. 2, or as scrap.

Upon entering the system 20, an identification code 30e unique to the lot 26e is read into the computer 28 through the use of an input device 34e at a block 46. A block 48 is operative to assign a pair of lot variables associated with the lot 26e in the lot memory 32. A first lot variable, $\alpha_w$, is a real number representative of the arrival time of the lot 26e to the system 20, and is preferably set equal to the time at which the lot 26e (designated by a w throughout) enters the system 20 at the workstation 22a. A second lot variable, $n_w$, is an integer number representative of the order of entry of the lot 26e to the system 20 with respect to other lots 26 of the same product type (designated by a p throughout) which have traveled, are traveling, and will travel through the system 20. The second lot variable is calculated with reference to a first system variable $n_p$, which is equal to the number of lots 26 of the same product type which have already entered the system 20. The second lot variable $n_w$ is set equal to the previous value of $n_p$ increased by one to indicate that the lot 26e is entering the system 20.

Figure 3:
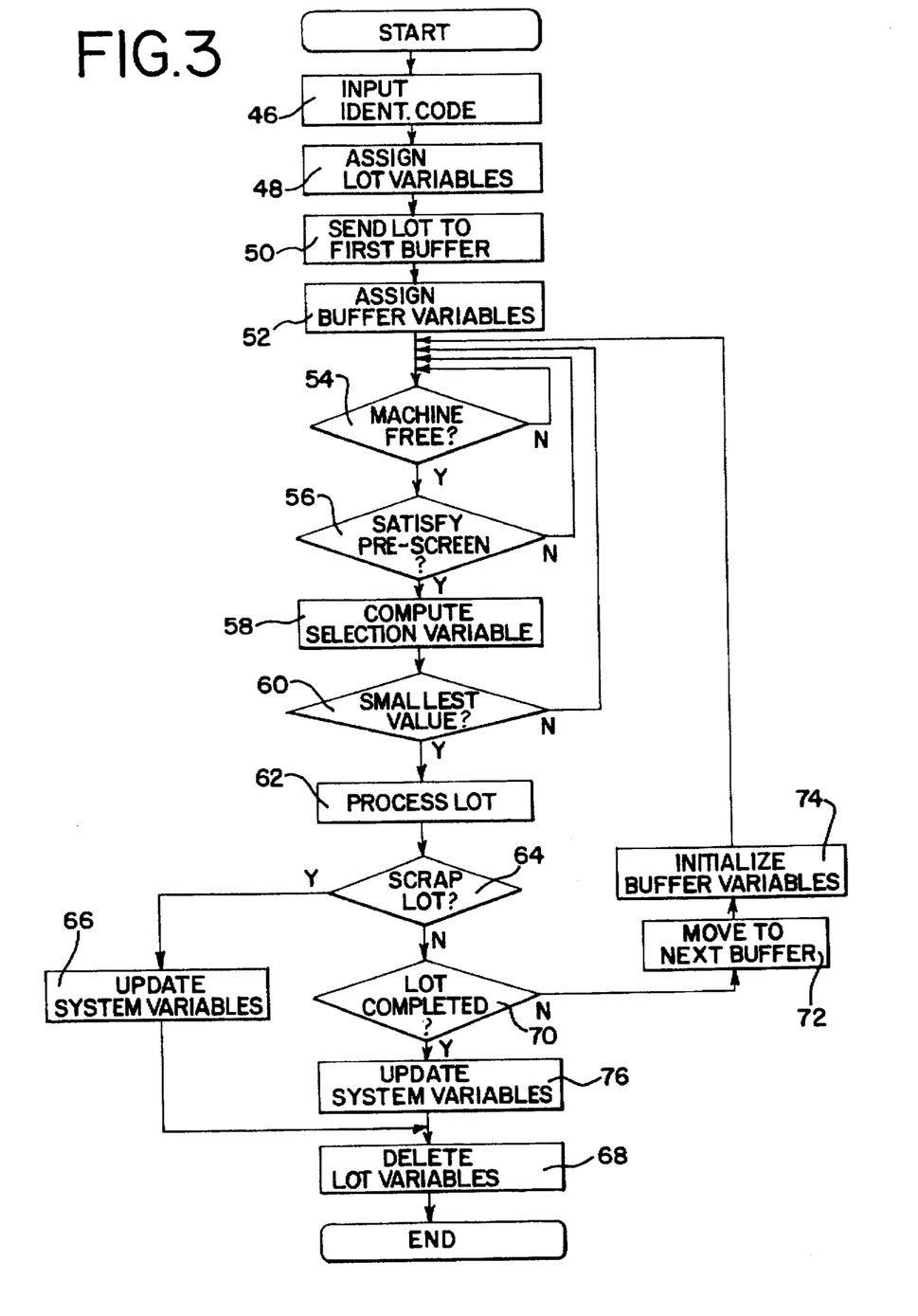
FIG. 3 is a system flow chart illustrating the movement of an incomplete product of a product type, for example a wafer lot, as the lot travels along a reentrant line.

While not shown in FIG. 3, it may be desirable to split lots 26 and merge lots 26 during processing in the system 20. In splitting lots 26, the resultant lots, 26' and 26", for example, preferably inherit the lot and buffer variables from the parent lot 26, e.g. $\alpha_w'$ and $\alpha_w''$ are set equal to $\alpha_w$ of the parent lot 26 and $n_w'$ and $n_w''$ are set equal to $n_w$ of the parent lot 26. Additionally, a second system variable $d_p$, explained in greater detail below, is reduced by one to reflect the increase in the number of lots 26 present in the system 20. In merging lots 26, the resultant lot 26 preferably inherits the lot and buffer variables from the parent lot, 26' or 26", for example, that was released earliest. Additionally, the system variable $d_p$ is increased by one to reflect a reduction in the number of lots 26 present in the system 20.

A block 50 sends the lot 26e to a buffer 24e at the first workstation 22a required to process the lot 26e into a specific product, such as a memory device, microprocessor or ASIC. A block 52 is then operative to assign four variables in the buffer memory 36 for the buffer 24e into which the lot 26e is sent. The buffer 24e is assigned a first buffer variable, $\alpha_{b,w}$, which is a real number representative of the arrival time of the lot 26e at the buffer 24e (designated by a b throughout), and is preferably set equal to the time at which the lot 26e enters the buffer 24e. A second buffer variable, representative of the mean arrival rate of lots 26 of a specific product type to the buffer 24e, is assigned according to the following equation (Eqn. 1):

$$\lambda_{p,b} = [(1/\lambda_{p,b}(\text{previous})) + (1/r_{\lambda,p})(\alpha_{b,w} - t_{p,b} - (1/\lambda_{p,b}(\text{previous})))]^{-1}$$

where $\lambda_{p,b}$=mean arrival rate at the buffer, b, for lots of the product type, p;

$\lambda_{p,b}$(previous)=previous value of the mean arrival rate;

$r_{\lambda,p}$=forgetting variable used to discount previous value of mean arrival rate in calculating the present value of the mean arrival rate;

$\alpha_{b,w}$=arrival time of lot, w, of the product type, p, at buffer, b; and $t_{p,b}$=time the previous lot of product type, p, arrived at buffer, b.

(While exponentially de-weighted averages are preferably used to calculate $\lambda_{p,b}$ and other lot and system variables in the preferred embodiment of the present invention, the variables could alternatively be calculated using a simple average, an average over a window, or some other statistical smoothing procedure.) The third buffer variable assigned, $r_{\lambda,p}$, as noted above, is used in the calculation of the mean arrival rate to discount the previous value of the mean arrival rate. The third real value variable is updated according to the following equation (Eqn. 2):

$$r_{\lambda,p} = (\theta_p \times r_{\lambda,p}(\text{previous})) + 1$$

where $r_{\lambda,p}$=forgetting variable;

$\theta_p$=scalar used to discount previous value of forgetting variable; and $r_{\lambda,p}$(previous)=previous value of the forgetting variable. The scalar used to discount the forgetting variable, $\theta_p$, can range from 0 to 1, but preferably is set at 1 or close to 1, or most preferably is set such that the half-life of the forgetting variable coincides with the period of change for the system for that product type and buffer. The fourth variable, $t_{p,b}$, a real number representative of the time of the previous arrival of a lot of product type p to the buffer 24e is then set equal to the present time.

If the workstation 22a is not ready to begin processing or is already processing a different lot 26, as determined at block 54, then further processing of the lot 26e is suspended pending the availability of the workstation 22a by returning to the block 54. If the workstation 22a is free and ready to begin processing, as determined at the decision block 54, then a decision block 56 determines if the lot 26e is conditionally processable at the workstation 22a, or whether other lots 26 exist which may have been pre-designated to receive expedited processing. For instance, it may be desirable to process all "hot" lots at a given workstation 22 prior to the processing of all other lots. Similarly, it may be desirable to expedite all lots which do not require alterations to be made in the set up of the workstation 22, or which require minimal amounts of operator supervision. If the determination is made at the block 56 that the lot 26e is not conditionally processable, then processing of the lot 26e is suspended pending the future availability of the workstation 22a by returning to the block 54.

If the lot 26e is within the group of lots determined to be conditionally processable at the block 56, then a selection variable for the lot 26e is computed at block 58. If the selection variable for the lot 26e is determined at a block 60 not to be the smallest selection variable among those lots 26 previously determined at block 56 to be conditionally processable at the workstation 22a, then further processing of the lot 26e is suspended pending the future availability of the workstation 22a by returning to the block 54. If the selection variable for the lot 26e is determined at block 60 to be the smallest selection variable computed for those lots 26 previously determined at block 56 to be conditionally processable at the workstation 22a, then the lot 26e is sent to the workstation 22a for processing at a block 62.

After processing has been completed for the lot 26e, a determination is made at a block 64 whether the lot 26e meets the quality criteria required of the lots 26 for a specific product type, or whether the lot 26e should be scrapped. If the lot 26e is determined not to meet the quality criteria for the specific product type at the block 64, i.e. the lot 26e should be scrapped, then at a block 66, a second integer value system variable, $d_p$, representing the number of lots 26 of a given product exiting the system 20 is increased by one to indicate that the lot 26e is being withdrawn from the system. At a block 68, the lot variables associated with the scrapped lot 26e, $\alpha_w$, $n_w$, and $\alpha_{b,w}$, are deleted from the lot memory 32 and the buffer memory 36.

If after processing, a determination is made at the block 64 that the lot 26e meets the quality criteria for its respective product type and that it should not be scrapped, then a further determination is made at a block 70 whether the lot 26e has passed completely through the reentrant line for that product type. If the block 70 indicates that the lot 26e is not complete, then the lot 26e is moved to a next buffer 24f at the next workstation 22b at a block 72. The next buffer 24f is not necessarily the next buffer in the reentrant line for the fabrication of the lot 26, as it may be desirable from a quality standpoint to strip several layers from the lot 26 and re-process the lot 26 through several upstream workstations 22 along the reentrant line before the lot 26 is allowed to proceed downstream along the reentrant line. The variables associated with the lot 26e at the buffer 24f for the next workstation 22b in the reentrant processing line are assigned at a block 74. Processing is then suspended on the lot 26e until the next workstation 22b becomes available by returning to the block 54.

If the block 70 determines that the fabrication of lot 26e into its final form is complete, i.e. the lot 26e represents a finished product, then the second system variable, $d_p$, is increased by one at a block 76 indicating that the lot 26e is leaving the system 20. In addition, a third system variable, $\zeta_{p,b}$, a real number representative of the estimated remaining cycle time for each product type and each buffer in the product's reentrant line, is updated according to the following equation (Eqn. 3):

$$\zeta_{p,b} = \zeta_{p,b}(\text{previous}) + (1/r_{\zeta,p})(t - \alpha_{b,w} - \zeta_{p,b}(\text{previous}))$$

where $\zeta_{p,b}$=estimate of remaining cycle time for a buffer, b, and a product type, p;

$\zeta_{p,b}(\text{previous})$=previous estimate of cycle time;[1]

$r_{\zeta,p}$=forgetting variable used to discount previous value of the estimate of cycle time in calculating the present value of the estimate of cycle time;

t=present time; and $\alpha_{b,w}$=arrival time of the lot, w, to the buffer, b.

At whatever time the method is initially applied to the fabrication system in question, this variable is preferably set initially equal to the sum of processing times of all the steps at all of the workstations in the reentrant line for the product type, p, after the buffer, b.

Lastly, the real value forgetting variable, $r_{\zeta,p}$, is updated for each buffer in the same fashion that the forgetting variable used in calculating the mean arrival time is updated. Moreover, the variables $\alpha_w$, $n_w$, and $\alpha_{b,w}$ associated with the lot 26e and the previous buffers 24 are deleted at the block 68.

Figure 4:
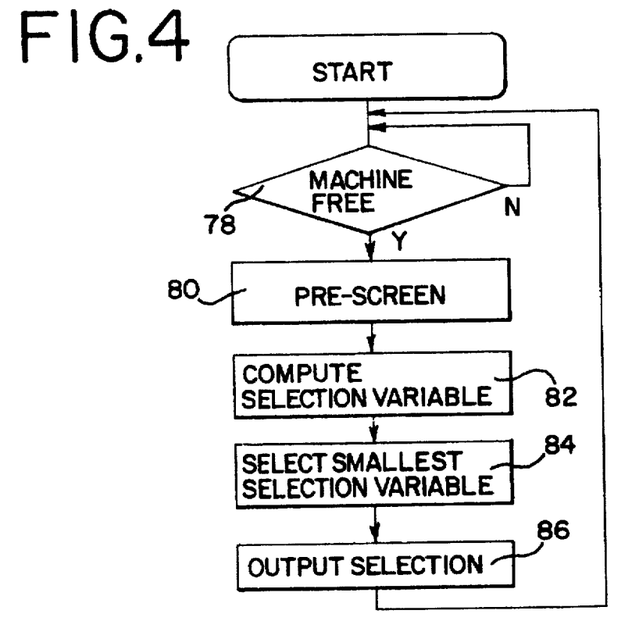
FIG. 4 is a flow chart for a program for scheduling the selection of a single incomplete product from a plurality of different incomplete products of different product types competing at a workstation for the workstation's limited resources.

Viewing the lot selection process now with reference to FIG. 4, a flow chart illustrates the operation of a control program for computing the selection variables associated with each lot 26 (block 58 in FIG. 3) and for performing the selection of the lot 26 (block 60 in FIG. 3) which will be processed next at the workstation 22 (block 62 in FIG. 3). A block 78 is operative to determine if the workstation 22 is available, i.e. if the workstation 22 is free to service lots 26 requiring processing. If the determination is made at the block 78 that the workstation 22 is not available, the program waits until such time as the workstation 22 is available. If the determination is made by the block 78 that the workstation 22 is available, then a further determination is made at a block 80 as to which lots 26, if any, should be processed in an expedited manner before the other lots 26.

Once a determination has been made at the block 80 as to which lots 26 are conditionally processable at the workstation 22, a selection variable unique to each lot 26 is computed for each conditionally processable lot 26 at a block 82. The selection variables for the lots 26 generated at the block 82 are compared with each other at a block 84, and a determination is made as to which selection variable has the smallest numerical value. The program then sends a processing order to the workstation 22 at a block 86 indicating to the operator the identification code 30 of the lot 26 corresponding to the selection variable chosen at the block 84, for example by displaying the identification code 30 or an equivalent thereof on the video display device 44 corresponding to the workstation 22 in question. The routine ends by returning to the decision block 78.

Figure 5:
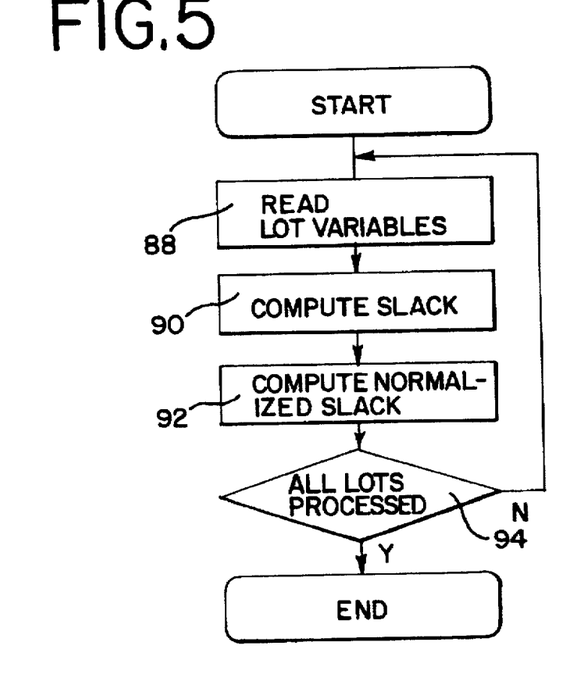
FIG. 5 is a flow chart for a routine for calculating the selection variables associated with each of the incomplete products competing for the workstation's limited resources, the routine useful with the program illustrated in FIG. 4.

The calculation of the selection variables at the block 82 in FIG. 4 for each of the lots 26 is performed using a routine according to the steps illustrated in the flow chart of FIG. 5. The calculation begins at a block 88 which reads the several values listed in greater detail below from the lot, buffer and system memories 32, 36, and 38. From these variables, a slack value is calculated at a block 90. According to the present invention, the slack calculated at the block 90 may be calculated according to the equation (Eqn. 4):

11

$$s_w=[(n_w-d_p)/\lambda_{p,b}]-\zeta_{p,b}$$

where $s_w$=slack of the lot, w;

$n_w$=release number of the lot, w;

$d_p$=total number of exits (scraps or completed lots) of the same product type, p;

$\lambda_{p,b}$=mean arrival rate to the buffer, b, for the product type, p; and $\zeta_{p,b}$=estimated average time from the buffer, b, to the end of the reentrant line for the product type, p.

Alternatively, the slack calculated at the block 90 may be calculated according to the equation (Eqn. 5):

$$s_w=\alpha_w-\zeta_{p,b}-t$$

where $s_w$=slack of the lot, w;

$\alpha_w$=release time of the lot, w, into the system;

$\zeta_{p,b}$=estimated average time from the buffer, b, to the end of the reentrant line for the product type, p; and t=current time.

The slack calculated at the block 90 is next normalized at a block 92. Normalization of the slacks calculated at the block 90 allows for a comparison to be made among the lots 26 for different product types. Here also, there are two alternatives for normalization, buffer-by-buffer or product-station. Both alternatives use the general formula (Eqn. 6):

$$z_w=[s_w-\mu(s)]/[\sigma(s)^2]^{1/2}$$

where $z_w$=normalized slack value for lot, w;

$s_w$=slack value for lot, w;

$\mu(s)$=mean of the slack value as a function of the buffer location and product type; and $\sigma(s)$=standard deviation of the slack value as a function of buffer location and product type.

Buffer-by-buffer normalization involves normalizing the slack $s_w$ with respect to the slack statistics for each product type at each buffer individually. Slack information from every lot that travels through the buffer is used to determine the mean and standard deviation statistics for the slack. The buffer-by-buffer normalization value is calculated according to the following equation (Eqn. 7):

$$z_w=(s_w-\mu_{p,b})/\sigma_{p,b}$$

where $z_w$=normalized slack variable or selection variable;

$s_w$=slack value for lot, w, of product type, p, at buffer, b;

$\mu_{p,b}$=mean slack values for all lots of product type, p, through buffer, b; and $\sigma_{p,b}$=standard deviation of slack values for all lots of product type, p, through buffer, b.

The mean slack value and standard deviation of slack value used in normalizing the slack values are updated each time the normalization is performed. In particular, to arrive at the values for mean slack and standard deviation of slack, the previous mean slack value and standard deviation of slack value are discounted and combined with the slack value undergoing normalization according to the following equations (Eqn. 8a–c):

$$\mu_{p,b}=\mu_{p,b}(previous)+(1/r_{p,b})(s_w-\mu_{p,b}(previous))  \quad [Eqn. 8a]$$

where

12

$\mu_{p,b}$=mean slack value;

$\mu_{p,b}$(previous)=previous value of mean slack value;[1]

$r_{p,b}$=forgetting variable used to discount previous value of mean slack value in calculating the present value of the mean slack value; and $s_w$=slack value of lot, w, of product type, p, at buffer, b.

At whatever time the method is initially applied to the system in question, this variable is preferably set initially equal to 0.

$$\delta_{p,b}=\delta_{p,b}(previous)+(1/r_{p,b})(s_w^2-\delta_{p,b}(previous))  \quad [Eqn. 8b]$$

where $\delta_{p,b}$=mean sum of square of slacks for lots, w, of product type, p, through buffer, b;

$\delta_{p,b}$(previous)=previous value of mean sum of squared slacks;

$r_{p,b}$=forgetting factor used to discount the previous value of the mean sum of square for slacks in calculating the present value of the mean sum of square of slacks; and $s_w$=slack value of lot, w, of product type, p, at buffer, b. and $$\sigma_{p,b}=(\delta_{p,b}-\mu_{p,b}^2)^{1/2}  \quad [Eqn. 8c]$$

where $\sigma_{p,b}$=standard deviation of slack values;[1]

$\delta_{p,b}$=mean sum of squared slacks for lots, w, of product type, p, through buffer, b; and $\mu_{p,b}$=mean slack value.

At whatever time the method is initially applied to the system in question, this variable is preferably set initially equal to 1.

Once the standard deviation for the slack values has been calculated, the forgetting variable, $r_{p,b}$, is updated according to the same method used for updating the other forgetting variables used in the preferred embodiment of the present invention.

Product-station normalization involves normalizing the slack for the lot with respect to the slack statistics for the product type from the set of all buffers at a given station. Slack information from every lot for a specific product type that visits any of the buffers at the station is used to determine the sample mean and standard deviation statistics. Considering that over the course of a product's production cycle the same lot will likely visit the same workstation numerous times, the same lot may contribute to the mean and standard deviation of the product-station slack statistics several times. Product-station normalization is calculated according to the following equation (Eqn. 9):

$$z_w=(s_w-\mu_{p,st})/\sigma_{p,st}$$

where $z_w$=normalized slack variable or selection variable;

$s_w$=slack value for lot, w, of product type, p, at buffer, b;

$\mu_{p,st}$=mean slack values for all lots of product type, p, through station, st; and $\sigma_{p,st}$=standard deviation of slack values for all lots of product type, p, through station, st.

The mean slack value and standard deviation of slack value used in normalizing the slack values are updated each time the normalization is performed. In particular, to arrive at the values for mean slack and standard deviation of slack, the previous mean slack value and standard deviation of slack value are discounted and combined with the slack value undergoing normalization according to the following equations (Eqn. 10a–c):

$$\mu_{p,st} = \mu_{p,st}(\text{previous}) + (1/r_{p,st})(s_w - \mu_{p,st}(\text{previous}))$$ [Eqn. 10a]

where $\mu_{p,st}$ = mean slack value;

$\mu_{p,st}(\text{previous})$ = previous value of mean slack value;[1]

$r_{p,st}$ = forgetting variable used to discount previous value of mean slack value in calculating the present value of the mean slack value; and $s_w$ = slack value of lot, w, of product type, p, at buffer, b.

At whatever time the method is initially applied to the system in question, this variable is preferably set initially equal to 0.

$$\delta_{p,st} = \delta_{p,st}(\text{previous}) + (1/r_{p,st})(s_w^2 - \delta_{p,st}(\text{previous}))$$ [Eqn. 10b]

where $\delta_{p,st}$ = mean sum of square of slacks for lots, w, of product type, p, through station, st;

$\delta_{p,st}(\text{previous})$ = previous value of mean sum of squared slacks;

$r_{p,st}$ = forgetting variable used to discount the previous value of the mean sum of square for slacks in calculating the present value of the mean sum of square of slacks; and $s_w$ = slack value of lot, w, of product type, p, at buffer, b. and $$\sigma_{p,st} = (\delta_{p,st} - \mu_{p,st}^2)^{1/2}$$ [Eqn. 10c]

where $\sigma_{p,st}$ = standard deviation of slack values;[1]

$\delta_{p,st}$ = mean sum of squared slacks for lots, w, of product type, p, through station, st; and $\mu_{p,st}$ = mean slack value.

At whatever time the method is initially applied to the system in question, this variable is preferably set initially equal to 1.

Once the standard deviation for the slack values has been calculated, the forgetting variable is updated according to the same method used for updating the other forgetting variables used in the method of the present invention.

Once a normalized slack index is calculated at the block 92 for the specific lot 26 waiting at the workstation 22, the program determines at a block 94 whether additional processable lots 26 are waiting at the workstation 22, such that additional slack and normalization calculations need be made. If the program determines at the block 94 that no additional conditionally processable lots 26 can be found at the workstation 22, the routine ends, passing the resulting selection variables to the block 84 (FIG. 4) and returning internally to the block 88.

Although a preferred embodiment of the method of the present invention has been discussed with reference to a fabrication system producing multiple product types, the method is useful in fabrication systems producing a single product type and embraces such applications as well. With specific respect to multiple product type fabrication systems, however, it should be noted that the present invention has been tested using industry provided data sets for semiconductor fabrication plants, and has showed an average percentage improvement of 19% in reducing the mean cycle time and an average percentage improvement of 49% in reducing the standard deviation of the cycle time. These levels of reduction may be typical of the level of performance of the present invention, and are a significant improvement over the standard FIFO policy.

Still other aspects, objects, and advantages of the present invention can be obtained from a study of the specification, the drawings, and the appended claims.

We claim:

1. A method of scheduling the processing of a plurality of incomplete products at a workstation in a reentrant line, each one of the plurality of incomplete products disposed in a buffer at the workstation and processable into one of a plurality of product types, the method comprising the steps of:

storing a time measurement variable for each one of the plurality of incomplete products representing an entry of the each one of the plurality of incomplete products into the reentrant line;

storing a time measurement variable for the buffer representing the time remaining for the incomplete products of the product type disposed in the buffer to be completed;

calculating the difference between the stored time measurement variable for each one of the plurality of incomplete products and the stored time measurement variable for the buffer in which the each one of the plurality of incomplete products is disposed to generate a slack variable for each one of the plurality of incomplete products;

normalizing the slack variable for each one of the plurality of incomplete products by comparing the slack variable of the each one of the plurality of incomplete products with the slack variables for all incomplete products of the product type of the each one of the plurality of incomplete products that have passed through the workstation to generate a selection variable for the each one of the plurality of incomplete products;

comparing the selection variables for the plurality of incomplete products to select one of the plurality of incomplete products for processing at the workstation; and processing the one of the plurality of incomplete products selected in the step of comparing the selection variables for the plurality of incomplete products.

2. The method according to claim 1, the step of normalizing the slack variables further comprising the steps of:

storing an estimate of a mean of the slack variables for the incomplete products of the product type that have passed through the buffer at the workstation;

storing an estimate of a standard deviation of the slack variables for the incomplete products of the product type that have passed through the buffer at the workstation;

calculating the difference between the slack variable of the each one of the plurality of incomplete products processable into one of the plurality of product types and the stored estimate of the mean of the slack variables for the product type; and dividing the result of the step of calculating the difference between the slack variable of the each one of the plurality of incomplete products and the stored estimate of the mean of the slack variables for the product type by the stored estimate of the standard deviation of the slack variables for the product type to generate the selection variable for each one of the plurality of incomplete products.

3. The method according to claim 1, the step of normalizing the slack variable further comprising the steps of:

storing an estimate of a mean of the slack variables for the incomplete products of the product type that have passed through the workstation;

storing an estimate of a standard deviation of the slack variables for the incomplete products of the product type that have passed through the workstation;

calculating the difference between the slack variable of the each one of the plurality of incomplete products processable into one of the plurality of the product types and the stored estimate of the mean of the slack variable for the product type; and dividing the result of the step of calculating the difference between the slack variable of the each one of the plurality of incomplete products and the stored estimate of the mean of the slack variables for the product type by the stored estimate of the standard deviation of the slack variables for the product type to generate the selection variable for each one of the plurality of incomplete products.

4. The method according to claim 3, further comprising the steps of:

updating the estimate of the mean of the slack variables for the product type after generating the selection variable for each one of the plurality of incomplete products; and updating the estimate of the standard deviation of the slack variables for the product type after generating the selection variable for each one of the plurality of incomplete products.

5. The method according to claim 1, further comprising the step of updating the time measurement variable for the buffer representing the time remaining for incomplete products of the product type disposed in the buffer to be completed after each one of the plurality of incomplete products of the product type is completed.

6. An apparatus for scheduling the processing of a plurality of incomplete products at a workstation in a reentrant line, each one of the plurality of incomplete products disposed in a buffer at the workstation and processable into one of a plurality of product types, the apparatus comprising:

means for storing a time measurement variable for each one of the plurality of incomplete products representing an entry of each one of the plurality of incomplete products into the reentrant line;

means for storing a time measurement variable for the buffer representing the time remaining for incomplete products of the product type disposed in the buffer to be completed;

means for calculating the difference between the stored time measurement variable for each one of the plurality of incomplete products and the stored time measurement variable for the buffer in which the each one of the plurality of incomplete products is disposed to generate a slack variable for each one of the plurality of incomplete products;

means for normalizing the slack variable for each one of the plurality of incomplete products by comparing the slack variable of the each one of the plurality of incomplete products with the slack variables for all incomplete products of the product type of the each one of the plurality of incomplete products that have passed through the workstation to generate a selection variable for the each one of the plurality of incomplete products; and means for comparing the selection variables for the plurality of incomplete products to select one of the plurality of incomplete products for processing at the workstation.

7. The apparatus according to claim 6, the means for normalizing the slack variables further comprising:

means for storing an estimate of a mean of the slack variables for the incomplete products of the product type that have passed through the buffer at the workstation;

means for storing an estimate of a standard deviation of the slack variables for the incomplete products of the product type that have passed through the buffer at the workstation;

means for calculating the difference between the slack variable of the each one of the plurality of incomplete products processable into one of the plurality of product types and the stored estimate of the mean of the slack variables for the product type; and means for dividing the result of the step of calculating the difference between the slack variable of the each one of the plurality of incomplete products and the stored estimate of the mean of the slack variables for the product type by the stored estimate of the standard deviation of the slack variables for the product type to generate the selection variable for each one of the plurality of incomplete products.

8. The apparatus according to claim 6, the means for normalizing the slack variable further comprising:

means for storing an estimate of a mean of the slack variables for the incomplete products of the product type that have passed through the workstation;

means for storing an estimate of a standard deviation of the slack variables for the incomplete products of the product type that have passed through the workstation;

means for calculating the difference between the slack variable of the each one of the plurality of incomplete products processable into one of the plurality of the product types and the stored estimate of the mean of the slack variable for the product type; and means for dividing the result of the step of calculating the difference between the slack variable of the each one of the plurality of incomplete products and the stored estimate of the mean of the slack variables for the product type by the stored estimate of the standard deviation of the slack variables for the product type to generate the selection variable for each one of the plurality of incomplete products.

9. The apparatus according to claim 8, further comprising:

means for updating the estimate of the mean of the slack variables for the product type after generating the selection variable for each one of the plurality of incomplete products; and means for updating the estimate of the standard deviation of the slack variables for the product type after generating the selection variable for each one of the plurality of incomplete products.

10. The apparatus according to claim 8, further comprising means for updating the time measurement variable for the buffer representing the time remaining for incomplete products of the product type disposed in the buffer to be completed after each one of the plurality of incomplete products of the product type is completed.

* * * * *